US012529195B2

(12) United States Patent
Obr et al.

(10) Patent No.: US 12,529,195 B2
(45) Date of Patent: Jan. 20, 2026

(54) METHOD OF SETTING THE WORKING PARAMETERS OF THE CONSTRUCTION MACHINE WHEN REPAIRING THE ROAD SURFACE OR LAYING THE CONSTRUCTION LAYER AND A DEVICE FOR CARRYING OUT THIS METHOD

(71) Applicant: Exact Control System a.s., Prague (CZ)

(72) Inventors: Vitezslav Obr, Trebic (CZ); Marek Prikryl, Velka Chuchle (CZ)

(73) Assignee: Exact Control System A.S., Prague (CZ)

(*) Notice: Subject to any disclaimer, the term of this patent is extended or adjusted under 35 U.S.C. 154(b) by 82 days.

(21) Appl. No.: 18/683,104

(22) PCT Filed: Aug. 8, 2022

(86) PCT No.: PCT/CZ2022/000033
§ 371 (c)(1),
(2) Date: Feb. 12, 2024

(87) PCT Pub. No.: WO2023/016588
PCT Pub. Date: Feb. 16, 2023

(65) Prior Publication Data
US 2024/0352686 A1 Oct. 24, 2024

(30) Foreign Application Priority Data
Aug. 13, 2021 (CZ) .................. CZ 2021-39088 U

(51) Int. Cl.
E01C 19/48 (2006.01)
E01C 23/01 (2006.01)
(Continued)

(52) U.S. Cl.
CPC .............. E01C 23/01 (2013.01); G01S 19/42 (2013.01)

(58) Field of Classification Search
CPC .......... E01C 19/48; E01C 19/00; E01C 23/01; E01C 23/07; E01C 23/088; G01C 1/02
See application file for complete search history.

(56) References Cited

U.S. PATENT DOCUMENTS 10,428,472 B1  10/2019  Worsley
2009/0311045 A1* 12/2009 Jurasz .................. E01C 23/088
                                                         404/90

(Continued)

FOREIGN PATENT DOCUMENTS

CZ      33276 U1    10/2019
EP    3795748 A1     3/2021

OTHER PUBLICATIONS

PCT Search Report and Written Opinion dated Nov. 8, 2022 for related PCT Application No. PCT/CZ2022/000033, 19 pages.

Primary Examiner — Tan Q Nguyen
(74) Attorney, Agent, or Firm — Hovey Williams LLP; Paul J. Walker

(57) ABSTRACT

The invention relates to a method of repairing the surface of roads, highways, or other transport routes and earthworks in transport and civil engineering, using a method of recording and future functionality dependent adjustment of the cross-slope of the work of a construction machine depending on its spatial position, hereinafter referred to as slope replication, and a device for carrying out this method. In particular, it refers to the replication of the slope during the travel of a road milling machine or the laying of a construction layer by a road paver.

10 Claims, 2 Drawing Sheets

(51) Int. Cl.
*G01S 19/42* (2010.01)
*G01C 1/02* (2006.01)

(56) References Cited

U.S. PATENT DOCUMENTS

2012/0301220 A1* 11/2012 Snoeck .................. E01C 23/07
   701/50
2014/0097665 A1* 4/2014 Paulsen .................. G01S 17/88
   356/601

* cited by examiner

METHOD OF SETTING THE WORKING PARAMETERS OF THE CONSTRUCTION MACHINE WHEN REPAIRING THE ROAD SURFACE OR LAYING THE CONSTRUCTION LAYER AND A DEVICE FOR CARRYING OUT THIS METHOD

RELATED APPLICATIONS

This application is the National Stage of International Patent Application No. PCT/CZ2022/000033, filed Aug. 8, 2022, which is hereby incorporated herein by reference in its entirety, and which claims priority to Czech Patent Application No. PUV 2021-39088, filed Aug. 13, 2021, which is also incorporated herein by reference in its entirety.

TECHNICAL FIELD

The invention relates to a method of repairing the surface of roads, highways, or other transport routes and earthworks in transport and civil engineering, using a method of recording and future functionally dependent adjustment of the cross-slope of the work of a construction machine depending on its spatial position, hereinafter referred to as slope replication, and the device for carrying out this method. In particular, it refers to the replication of the slope during the travel of a road milling machine or the laying of a construction layer by a road paver.

BACKGROUND ART

The road surface is subjected to a number of influences during its life cycle that change its structural and geometric properties. The most common negative effects of changes in road surface geometry are ruts, potholes, subsidence, and cracks. From the point of view of the road user, the driver, this mainly results in a reduction in the smoothness of driving, an increase in the vibrations of the whole vehicle, a reduction in the dynamic stability of the vehicle and insufficient drainage of the road surface.

Repair by replacing the top damaged layer is carried out using the following procedure. Damaged uneven road surfaces, rutted tracks, potholes, dips, and cracks are first milled off with a certain thickness. A new asphalt, concrete or other so-called construction layer is then laid on the resulting surface layer after milling. The thickness of the new construction layer should ideally be constant over the entire repair area. Different thicknesses of the new structural layer cause the reappearance of unevenness due to the different compressibility of layers of different thicknesses. Therefore, it is the effort of the operators of road milling machines to smooth out all unevenness by milling and the resulting milled surface is flat, that is, to ensure maximum smoothness of driving in the longitudinal direction and road drainage and safe driving in the transverse direction. Ensuring a cross slope for good drainage is further complicated by the fact that milling and laying are carried out in one or more strips parallel to the road axis, in so-called travels. These travels must have identical cross slopes at the same stationings or the slopes must be functionally dependent on each other to achieve the required topography, for example, to ensure good drainage.

To achieve the desired topography of the structural layer surface after milling or laying, three principle procedures are used.

The first principle is fully manual control of setting the depths and inclinations of milling or the power and inclinations of laying, hereinafter only as working parameters, when the operator of the construction machine manually sets the working parameters based on the estimation of the situation in order to achieve a certain required topography of the resulting surface.

The second principle is the automatic or semi-automatic input of these parameters, where the required working parameters of the construction machine, related to its instantaneous position, are calculated or set analogue based on the information obtained by the working tool, for example a road milling machine or a paver, at the work site within the same working travel from contact or non-contact measuring devices connected to the working tool. The setting of the working parameters is carried out simultaneously with the measurement. These include Wirtgen's MultiPlex devices—so-called averaging skids—or an analog touch system using pre-prepared guide wires to provide the required depths, thicknesses and inclinations.

The third principle, the so-called 3D remote guidance of a working tool such as a road milling machine or paver, is the automatic adjustment of milling or paving depths and slopes based on a pre-prepared 3D digital terrain model of the surface of the construction layer and the specified spatial position of the construction machine. Such 3D control of the construction machine can be carried out over the entire width and length of the roadway, completely automatically.

In the first and second principles of milling or laying, the following situation occurs. As the roadway is usually wider than the width of the milling roller of the road milling machine or the effective width of the road paver, it is often necessary to mill or lay in several working strips—travels. To achieve good drainage of the road surface and good driving characteristics, it is necessary to maintain the same lateral slopes in all working travels at each stationings of the road or to adjust the slopes in such a way as to maintain good drainage. It is therefore necessary to have, for each stationing of a new travel of a road milling machine or a paver, information on the gradient that was implemented in the previous travel at that stationing. Currently, it is common practice to spray this information directly onto the surface of the road during the first working travel, and during all subsequent travels, the road milling machine operator reads this information and simultaneously manually sets it into the construction machine, for example a road milling machine or a paver. This leads to many errors caused by inaccurate interpolation of discrete recorded cross slope values, errors caused by human factors, or errors caused by extreme effects such as erasure of recorded values from the road surface.

The third principle used in milling provides the possibility of full automation, but its main disadvantage is the very high cost of the initial surveying and creation of a 3D model of the actual condition of the road surface topography and modelling of the desired condition after repair. Another disadvantage is that this measurement and modelling often has to be done days or weeks in advance for technical and formal reasons, where the resulting models have to be checked and approved by the relevant entity. It is therefore only used for higher class roads.

SUMMARY OF INVENTION

The aforementioned shortcomings are largely eliminated by the way of setting the working parameters of the construction machine during repair of the road surface, especially by milling or during laying of the construction layer, wherein the construction machine is provided with a control device of its working tool and a communication port, according to the present invention. Its essence is that during the milling or laying of the travel preceding the travel where the cross slopes are replicated, the cross slope values and positional data from the positioning system of the construction machine are automatically stored in a database, and during the working travel where the required cross slopes are identical or functionally dependent with the slopes of at least one preceding travel, the positional data for determining the position of the working tool is received in real time and the required cross slope is determined on the basis of the recorded cross slopes in the database that have been recorded in at least one previous travel in the stationing corresponding to the stationing of the current position of the construction machine. The detected data is transmitted to the construction machine for setting the working tool in at least one manner selected from the group consisting of manual input, automatic transmission to the construction machine control device and automatic transmission to the communication port of the construction machine.

The values from the database can be manually adjusted by the operator, after which the construction machine sets the repair or paving slope values automatically.

Additional information stored in previous travel is advantageously presented during the working travel.

Determination of the position of the construction machine relative to the selected reference coordinate system is preferably performed using an element selected from the group consisting of a global navigation satellite system receiver, an electronic theodolite for measuring angles and lengths, a reflecting device, a rangefinder, an odometer, a digital camera, a mobile communication network.

In an advantageous embodiment, the cross slope values and positional data are processed into the form of a filtered trajectory.

For the above-described method, according to the present invention, a device is used, the essence of which is that a system is attached to the construction machine for determining the position of the working tool of the construction machine with respect to a selected reference coordinate system. The output of this system is connected to the input of a control unit equipped with a display device for visual control of data recording and its quality and with control elements. The control unit is connected to the output of the recording device of the current information on the set transverse inclination of the working tool. At the same time, the control unit is connected bi-directionally to the database for recording the values of the cross-slope of milling or laying in individual travels. The control unit is equipped with a program for calculating the desired milling cross slope based on the values recorded in the database in the previous one or more travels, and correction elements for correcting the detected values according to the needs of the operator of the construction machine.

The control unit has a sub-module on its input for reading and registering the values of the cross slope of the milling or laying in a given travel. The output of this submodule is connected via the database to one input of the submodule for reading data from the database. A second input of the submodule for filtering the registered values into a smoothed trajectory is connected to the output of the construction machine tool positioning system and its output is connected via the submodule for calculating the cross-slope of the milling or laying tool to the display device via correction elements and to the control device of the construction machine tool via the submodule for sending information about the corrected cross-slope values of the milling or laying tool.

In an advantageous embodiment, the output of the submodule for reading and registering the values of the cross slope of milling or laying in the given travel is connected to the database via a submodule for filtering the registered values into the form of a smoothed trajectory.

The system for determining the position of the working tool of the construction machine in relation to the selected reference coordinate system may consist of any element from the group of a global navigation satellite system receiver, an electronic theodolite for measuring angles and lengths, a reflecting device, a rangefinder, an odometer, a digital camera, a 5G mobile communication network.

The working tool is a road milling machine or a paver.

The advantage of this device is that it does not require expensive 3D surveying and 3D modelling and at the same time it ensures the continuity of the cross slopes of the individual travels across the entire width of the road so that, for example, good road drainage is guaranteed. At the same time, the process is automatic and minimizes the errors of the human factor.

For setting the milling inclination or laying new working travels, the recorded data of the inclinations realized in previous working travels and the information about the position of the road milling machine in relation to the selected reference system are used.

The construction machine is complemented by an additional device that records the position and inclination of the milling or laying in a particular travel and uses this information together with the current position information to calculate the milling or laying inclination in subsequent travel. It thus ensures significant automation of the pavement reconstruction process, eliminating many potential errors caused by human factors or extreme conditions.

The described solution has an advantage over the third principle in significantly reduced costs for the creation of milling bases, creation of a 3D model of the actual and planned state. It can thus be used on any traffic communication, where it is not necessary or possible to carry out previous 3D measurements and modelling.

The advantages of this invention lie in the fact that after milling or laying and recording positional data and data on manually, semi-automatically or automatically set transverse inclinations during the first travel, milling or laying of subsequent travels requiring identical or functionally dependent inclinations can be carried out automatically, thus minimising the negative influence of the human factor. In this way, the required slope is guaranteed over the entire width of the road and proper drainage of the road is achieved. At the same time there is no need to carry out 3D terrain surveying and 3D model creation in advance. Furthermore, no additional costly navigation systems are required for milling or paving using the described invention. The operator can also assign additional information to the selected positionally recorded points during driving, which can be further used to facilitate the milling or paving process. In addition, the positionally recorded travel trajectories can be used as quantitative data to evaluate the progress and results of the milling or paving operation.

The above described solution for recording and replication of transverse gradients is developed in such a way that its use is not only for road milling machines and pavers, but it is also applicable for other construction machines, which can be for example dozers or graders when working not only on roads, but also on all earthworks in transport and civil engineering.

According to the available information sources, a device working on this principle has not been implemented anywhere so far.

BRIEF DESCRIPTION OF DRAWINGS

An example of a device for setting the working parameters of a construction machine during road surface repair or during the laying of a structural layer is shown in FIG. 1.

Figure 3:
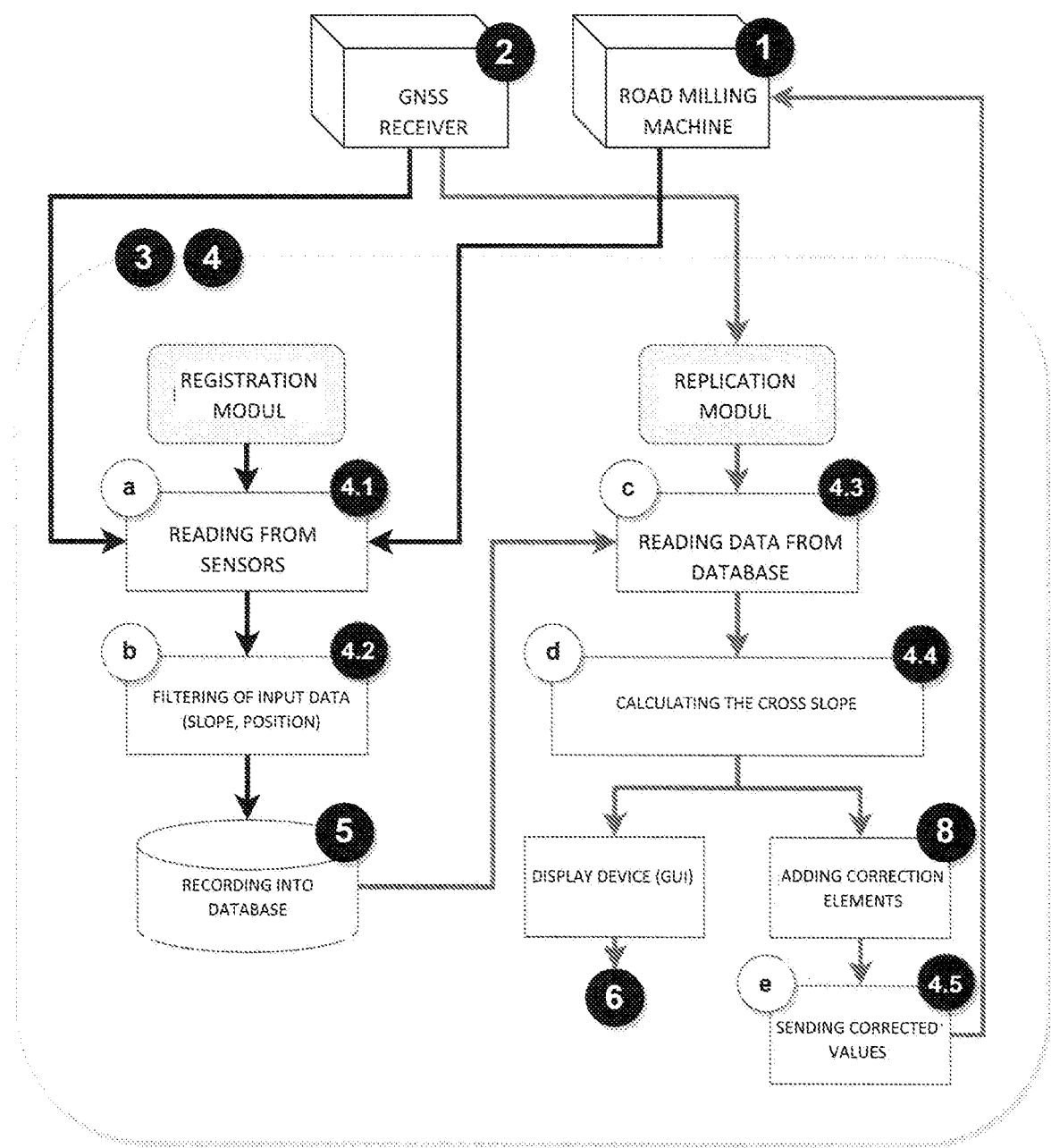

The principle of the device function is described using FIG. 3.

DESCRIPTION OF EMBODIMENTS

In an exemplary method of setting the working parameters of a construction machine during road surface repair, in particular milling or paving, where the construction machine is equipped with a control device of its working tool and a communication port, the cross slope values and positional data from the positioning system of the construction machine are automatically stored in a database during milling or paving of the travel preceding the travel when the cross slopes are replicated. In a working travel where cross slopes identical to or functionally dependent on the slopes of at least one previous travel are required, positional data is received to determine the position of the working tool in real time and the required cross slope is determined based on the recorded cross slopes in the database that have been recorded in the previous at least one travel in the stationing corresponding to the stationing of the current position of the construction machine. The detected data is transmitted to the construction machine for setting the working tool in at least one manner selected from the group consisting of manual input, automatic transmission to the construction machine control device and automatic transmission to the communication port of the construction machine. The values from the database are manually adjusted by the operator, whereupon the construction machine sets the repair or laying slope values automatically. Additional information stored in previous travel is presented during the working travel.

Determination of the position of the construction machine with respect to the selected reference coordinate system is carried out using an element selected from the group of a global navigation satellite system receiver, an electronic theodolite for measuring angles and lengths, reflective device, rangefinder, odometer, digital camera, mobile communication network.

In another embodiment, the cross slope values and positional data are processed in the form of a filtered trajectory.

An exemplary device for adjusting the working parameters of a construction machine for road surface repair or for laying the structural layer of a building structure, wherein the construction machine 1 is provided with a control device of its working tool and a communication port, will be further presented on a road milling machine or a paver.

Figure 1:
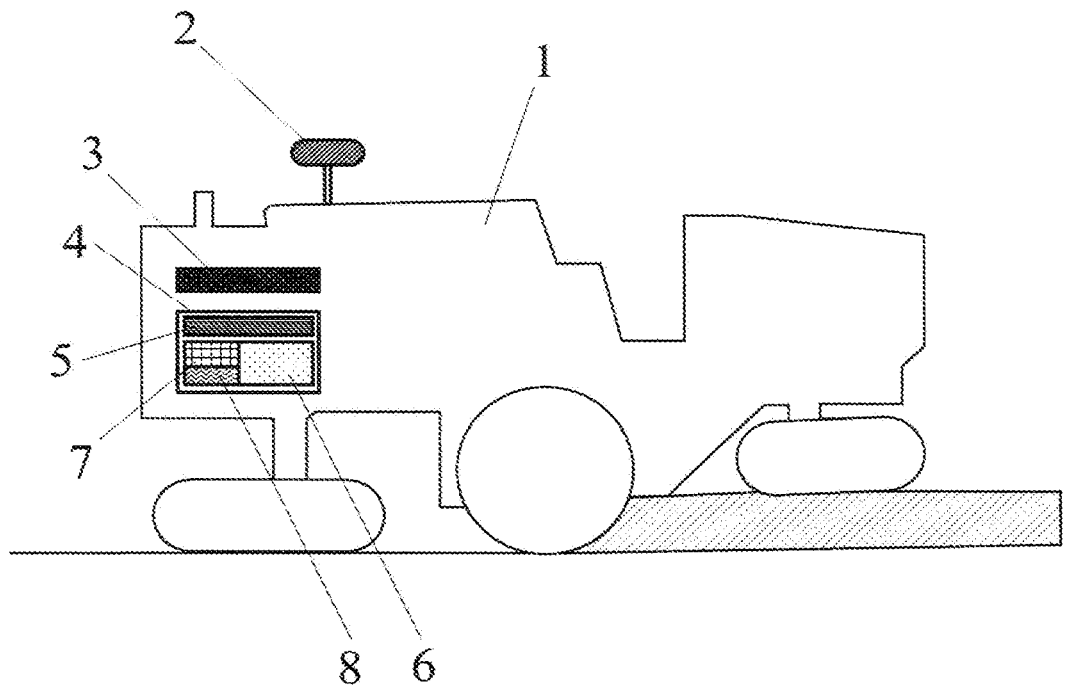
Figure 2:
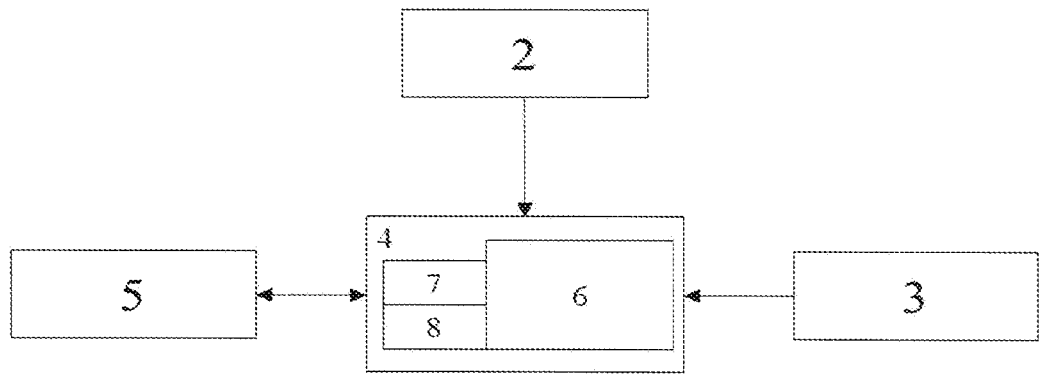
FIG. 2 shows a diagram of the interconnection of the individual components of the system mounted on the construction machine.

On the construction machine 1, FIG. 1, a system 2 is attached for determining the position of the working tool of the construction machine 1, here a road milling machine or a paver, with respect to a selected reference coordinate system. The output of the system 2 for determining the position of the working tool of the construction machine 1 is connected to the input of a control unit 4 equipped with a display device 6 for visual control of the data recording and its quality, and with control elements 7. The control unit 4 is connected both to the output of the registering device 3 of the current information on the set transverse inclination of the working tool, and bidirectionally to the database 5 for recording the values of the transverse inclinations of milling or laying in individual travels. The control unit 4 is equipped with a program for calculating the required cross slope of milling or laying on the basis of the values recorded in the database 5 in the previous one or more travels, and with correction elements 8 for correcting the detected values according to the needs of the operator of the construction machine 1.

The system 2 for determining the position of the working tool of the construction machine 1 with respect to the selected reference coordinate system may comprise an element from the group consisting of a GNSS receiver, an electronic theodolite for measuring angles and lengths, a reflecting device, a range finder, an odometer, a digital camera, a 5G mobile communication network. In the example given, a GNSS receiver or a fifth generation telephone network signal receiver, so called 5G, is used.

FIG. 3 includes an example of the arrangement of the control unit 4. The control unit 4 has a submodule 4.1 at its input for reading and registering the values of the milling cross slope or laying in a given travel. The output of this sub-module 4.1 is connected directly or via sub-module 4.2 for filtering the registered values into the form of a smoothed trajectory and via database 5 to one input of sub-module 4.3 for reading data from database 5. The second input of sub-module 4.3 for reading data from database 5 is connected to the output of system 2 for determining the position of the working tool of construction machine 1.3 for reading the data from the database 5 is connected via submodule 4.4 for calculating the cross slope of the milling or laying work tool via correction elements 8 to the display device 6 and via submodule 4.5 for sending information about the corrected values of the cross slope of the milling or laying work tool to the control device of the construction machine work tool 1.

On the construction machine 1 of the road milling machine or paver 1, the positioning system 2 is attached to the construction machine 1 at an elevated position, for example by means of a tie rod. A recording device 3 of current information on the set inclination of the road milling machine, together with a control unit 4, are located close to the point of movement of the operator of the construction machine 1 and register positional data and milling or paving data in a database 5. The attachment of the units to the construction machine 1 can be done, for example, magnetically. The connection between the device 2, the registration device 3 and the control unit 4 is physically implemented, for example, by suitable cabling or wireless technologies.

The control unit 4 contains a display device 6, control elements 7, by which the operator can assign additional information to the given position of the construction machine, as well as correction elements 8 for possible manual adjustment of the data transmitted to the construction machine 1. The control unit 4 is positioned close to the control panel of the construction machine 1 so that the operator can easily read and check the information and, if necessary, correct it.

When using the device, for example, to record information about the milling or paving process with road milling machines or pavers, the recorded data is related to the position of the trajectory points and the subsequent generation of control data for the road milling machine or paver according to their current position. The position of the construction machine is determined relative to the selected reference coordinate system. The reference coordinate system may be implemented by a global coordinate system of global navigation satellite systems, a reference coordinate system of national position and height network, the reference coordinate system of the structure, or the stationing and perpendicularity system of the traffic route. In the following, we will generally refer to the above as the positioning system.

The main components of said device are a system 2 determining the position of the construction machine 1, for example a road milling machine or a paver, a registration device 3 registering the actual information on the set cross slope of the milling or laying operation, and a control unit 4 implementing the interconnection of the registration device 3, which stores the registered position data and the milling or laying operation data in a database 5. The control unit 4 and the registration device 3 may comprise a single physical element, for example an industrial computer or a tablet.

The control unit 4 is further equipped with or connected to the display device 6 for visual control of data recording and its quality, control elements 7, by which the milling operator can assign additional information to the given position of the construction machine, and also correction elements 8, by which the operator can manually adjust the implemented inclination, or can set automatic inclination corrections according to the selected functional dependence. Thus, the technical device can record information about the position and the actual inclination of the road milling machine together with any additional data in real time for any travel of the construction machine 1, for example a road milling machine or a paver. Thus, the display device 6 displays information for the operator of the machine, which may be information about the current position and its accuracy obtained from the GNSS receiver, a panel for selecting individual records to which new data corresponding to the travel should be registered or from which it will be replicated, buttons for starting/stopping the registration or replication of the travel, an indication of the station at which it is located, the current inclination of the road milling machine or paver, the interpolated value of the transverse inclination.

During the milling or laying of the first travel, the operator can manually set the values using the milling machine control panel, or these values are set according to the second principle of automatic or semi-automatic control described above, for example, by means of the Wirtgen Multiplex. The inclination data are automatically stored together with the position data in the database 5.

At the moment of milling or laying of a new travel, where a transverse slope identical to or functionally dependent on the transverse slope of the previous working travel is required, the control unit receives position data from the positioning system in real time and calculates the slope using the slope database, for example by searching for the nearest adjacent point of the next travel or interpolated at the heel of the perpendicular of the previous trajectory to the current position, Together with the evaluated milled or laid inclination, additional information stored by the operator during previous travels is presented on the display device 6. The operator can also use the correction elements 8 to manually adjust the milled or laid inclination, if necessary, or to set automatic inclination corrections according to the selected functional dependence.

The road milling machine or paver positioning system is used to determine the spatial position of the road milling machine or paver and is attached to the road milling machine or paver in a location that provides good positioning conditions.

The recording device 3 and the control unit 4 are often located close to the point of movement of the operator of the road milling machine or paver and perform recording and reading to and from the database 5. Additional information associated with the current position can be stored in the database 5 by the operator of the construction machine 1 using the control elements 7.

The operating parameters of the new travel calculated on the basis of the data in the database 5 are sent by the control unit 4 to the display device 6. Furthermore, the data are transmitted to road milling machine or paver in one of the following ways: manual input by the operator to the control device of road milling machine or paver; automatic transmission to the control device of road milling machine or paver; automatic transmission to the communication port of road milling machine or paver with a control display on the control device of road milling machine or paver. The values calculated from the data in the database may be manually adjusted either by correction elements 8 or on the control device of the road milling machine. By correction element 8 is meant an adjustment of the recorded slope, either by a constant value or by a value functionally dependent on the distance and slope values of the previous travel or travels. The correction elements 8 may be, for example, keys or touch screen icons used to correct the calculated cross slope as required of the road milling machine operator. The road milling machine or paver then sets the milling or paving slope values automatically based on the values taken.

The control unit 4, connected to or equipped with the display device 6, the control elements 7 and the correction elements 8, is preferably located close to the control panel of the control device of the road milling machine or the paver so that the operator can read and check the information or correct it.

Database 5 is stored in the computer's memory or is accessible on remote storage. The database 5 contains information about the points assigned a position determined by the positioning system of the construction machine 1, the values of the milling or paving inclinations realized in the previous travel, or additional information manually entered by the milling or paving operator.

A schematic representation of the functional steps of the program is shown in FIG. 3.

During the milling or laying of the first travel, the so-called registration travel, the operator manually sets the cross slope values using the control device of the milling machine or paver. In step a, the set cross slope data together with the position data are read from the slope or position sensor, further processed in step b into a filtered trajectory and then automatically stored in the database 5. At the time of a working travel of the construction machine for which the required transverse inclinations are identical or functionally dependent with the inclinations in the previous travel of the construction machine, the control unit 4 receives position data from the system 2 for determining the position of the position determining tool in real time and in steps c and d calculates the required transverse inclination on the basis of the recorded transverse inclinations in the database 5, which were recorded in the previous one or more travel in the stationing corresponding to the stationing of the current position of the construction machine. Together with the calculated cross slope, additional information stored by the operator in previous travel is presented on a display device 6 fitted or connected to the control unit 4. The operator can also manually adjust the milled or laid inclination, if necessary, by means of correction elements 8.

The data for the milling of the new travel determined on the basis of the data in the database 5 is sent by the control unit 4 to the display device 6. The data is further transmitted to the milling machine or paver in step e in one of the following ways: manual input by the operator to the control device of the milling machine or paver; automatic transmission to the control device of the milling machine or paver; automatic transmission to the communication port of the milling machine or paver with a control display on the control device of the milling machine or paver. The values calculated from the data in the database 5 may be manually adjusted by the operator either by correction elements 8 or at the road milling machine control device. The construction machine then adjusts the milling or laying inclination values automatically based on the taken values.

INDUSTRIAL APPLICABILITY

The present invention is used to record the transverse inclinations of the surface of a structural layer and to replicate it. The recording is done by working or merely registering travel of the construction machine at the location of the surface of the structural layer whose transverse slope is to be replicated. It is also possible to register positionally determined additional information. Replication may be exact or functionally derived from previous recordings. The recording and replication use spatial position information of the construction machine obtained from a global navigation satellite system.

The method and device are developed in such a way that their use is not only for road milling machines and pavers, but is also applicable to other construction machines, which can be for example dozers or graders for work not only on roads, but also on all earthworks in transport and civil engineering.

LIST OF REFERENCE SIGNS 1 construction machine road milling machine or paver
2 system determining the position of the construction machine
3 registration device
4 control unit
5 database
6 display device
7 control elements
8 correction elements
4.1 submodule for reading and registering the milling inclination
4.2 submodule for filtering registered values
4.3 submodule for reading data from the database
4.4 submodule for calculating the milling cross slope
4.5 submodule for sending corrected slope information

The invention claimed is:

1. A method of setting the working parameters of a construction machine when repairing a road surface, in particular by milling or paving a structural layer, wherein the construction machine is provided with a control device of its working tool and a communication port, characterized in that during a milling or paving pass that precedes a pass where cross slopes are replicated, a cross slope values and position data from a construction machine positioning system are automatically stored in a database, and during a working pass where cross slopes are required to be identical to, or functionally dependent on, the cross slopes of at least one previous pass, positional data are received to determine a position of a working tool in real time and the required cross slope is determined from the recorded cross slopes in the database, that have been recorded in at least one previous pass at a stationing corresponding to a stationing of the current position of the construction machine, wherein the determined data is transmitted to the construction machine for setting the working tool by at least one method selected from the group consisting of manual input, automatic transmission to the construction machine control device, and automatic transmission to a construction machine communication port.

2. The method according to claim 1, characterized in that the values from the database are manually adjusted by the operator, whereupon the construction machine sets the values of the repair or paving slope automatically.

3. The method according to claim 1, characterized in that additional information stored in previous passes is presented during the working pass.

4. The method according to claim 1, characterized in that the determination of the position of the construction machine relative to the selected reference coordinate system is carried out using an element selected from the group consisting of a global navigation satellite system receiver, an electronic theodolite for measuring angles and lengths, a reflecting device, a rangefinder, an odometer, a digital camera, a mobile communication network.

5. The method according to claim 1, characterized in that the cross slope values and the position data are processed into a filtered trajectory.

6. A device for setting the working parameters of a construction machine for repairing the surface of a road or for paving a structural layer of a building structure, for carrying out the method according to claim 1, characterized in that, a system (2) for determining the position of a working tool of the construction machine (1) relative to a selected reference coordinate system, the output of which is connected to an input of a control unit (4) equipped with a display device (6) for visual control of data recording and its quality and control elements (7), is mounted on the construction machine (1), this control unit (4) is connected to the output of a registration device (3) for current information on the set cross-slope of the working tool and bidirectionally to a database (5) for recording the values of the cross-slope of milling or paving in individual passes, wherein the control unit (4) is provided with a program for calculating the required milling or paving cross slope on the basis of the values recorded in the database (5) in the previous one or more passes and correction elements (8) for correcting the values obtained according to the needs of the operator of the construction machine (1), and this control unit (4) has at its input a submodule (4.1) for reading and registering the values of the cross slope of milling or paving in a given pass, the output of which is connected via a database (5) to one input of the submodule (4.3) for reading data from the database (5), the other input of which is connected to the output of the system (2) for determining the position of the working tool of the construction machine (1), and the output of which is via the submodule (4.4) for calculating the cross slope of the milling or paving work tool is connected via correction elements (8) both to the display device (6) and via submodule (4.5) for sending information about the corrected cross-slope values of the milling or paving work tool to the control device of the construction machine work tool (1).

7. The device according to claim 6, characterized in that the output of the submodule (4.1) for reading and registering the values of the cross slope of the milling or paving operation in the given pass is connected to the database (5) via the submodule (4.2) for filtering the registered values into the form of a smoothed trajectory.

8. The device according to claim 6, characterized in that the system (2) for determining the position of the working tool of the construction machine (1) relative to a selected reference coordinate system comprises an element from the group consisting of a global navigation satellite system receiver, an electronic theodolite for measuring angles and lengths, a reflecting device, a rangefinder, an odometer, a digital camera, a 5G mobile communication network.

9. The device according to claim 6, characterized in that the working tool is a road milling machine.

10. The device according to claim 6, characterized in that the working tool is a paver.

* * * * *